(12) United States Patent
Saya (10) Patent No.: US 6,437,480 B1
(45) Date of Patent: Aug. 20, 2002

(54) APPARATUS AND METHOD FOR DRIVING AN ULTRASONIC MOTOR TO REDUCE RISE RESPONSE TIME

(75) Inventor: Daisuke Saya, Urayasu (JP)

(73) Assignee: Nikon Corporation, Tokyo (JP)

(*) Notice: Subject to any disclaimer, the term of this patent is extended or adjusted under 35 U.S.C. 154(b) by 1267 days.

(21) Appl. No.: 08/916,413

(22) Filed: Aug. 22, 1997

Related U.S. Application Data (63) Continuation of application No. 08/385,431, filed on Feb. 8, 1995, now abandoned.

(30) Foreign Application Priority Data

Feb. 8, 1994 (JP) ............................................. 6-014122

(51) Int. Cl.⁷ ................................................. H02N 2/00
(52) U.S. Cl. ............................ 310/316.01; 310/316.02; 310/317
(58) Field of Search ................................ 310/316, 317; 318/116

(56) References Cited

U.S. PATENT DOCUMENTS

| | | | | |
|---|---|---|---|---|
| 4,926,084 A | * | 5/1990 | Furutsu et al. | 310/316 |
| 5,477,099 A | * | 12/1995 | Suganuma | 310/316 |
| 5,479,063 A | * | 12/1995 | Suganuma | 310/316 |

FOREIGN PATENT DOCUMENTS

| | | | | |
|---|---|---|---|---|
| JP | 1-321876 | 12/1989 | | H02N/8/00 |
| JP | 5-14511 | 2/1993 | | H02N/2/00 |

\* cited by examiner

*Primary Examiner*—Thomas M. Dougherty
(74) *Attorney, Agent, or Firm*—Staas & Halsey LLP (57) ABSTRACT

An apparatus and method for driving an ultrasonic motor to reduce the rise response time. The ultrasonic motor is drivable at different frequencies and has a desired target speed, each frequency corresponding to a respective speed and a respective torque. The ultrasonic motor enters a specific mode after being started and driven. When the ultrasonic motor is started, a drive control unit drives the ultrasonic motor at a frequency corresponding to approximately a maximum torque. When the ultrasonic motor enters the specific mode, the drive control unit drives the ultrasonic motor at a frequency corresponding to approximately the target speed. Alternatively, the ultrasonic motor can be driven at different drive voltages, each drive voltage having corresponding frequencies, with each frequency of each drive voltage corresponding to a respective speed and a respective torque. The ultrasonic motor enters a specific mode after being started and driven. When the ultrasonic motor is started, the drive control unit selects a drive voltage, and drives the ultrasonic motor at the selected drive voltage and at a frequency of the selected drive voltage which corresponds to a maximum torque. When the ultrasonic motor enters the specific mode, the drive control unit selects a different drive voltage, and drives the ultrasonic motor at the selected, different drive voltage and at a frequency of the selected, different drive voltage which corresponds to approximately the target speed.

9 Claims, 6 Drawing Sheets

DRIVE FREQUENCY
CHARACTERISTIC CURVE OF ULTRASONIC MOTOR

APPARATUS AND METHOD FOR DRIVING AN ULTRASONIC MOTOR TO REDUCE RISE RESPONSE TIME

This application is a continuation of application Ser. No. 08/385,431, filed Feb. 8, 1995, now abandoned.

BACKGROUND OF THE INVENTION

1. Field of the Invention

The present invention relates to an ultrasonic motor having a moving body which is driven by progressive oscillations and, more particularly, to drive control of an ultrasonic motor having a moving body which is driven by progressive oscillations.

2. Description of the Related Art

Japanese Patent Publication No. Sho 59-156168 discloses a conventional device for performing drive control of an ultrasonic motor. In such a conventional device, an ultrasonic motor consists of a stator and a moving body which is in contact with the stator. The moving body is driven by progressive oscillations in the stator, which are produced by a voltage. The frequency of the voltage is sequentially modulated, the drive speed of the moving body at each frequency is measured, the frequency at the highest drive speed is stored, and the ultrasonic motor is driven at the voltage corresponding to the frequency of the highest drive speed. Thus, control is performed so that the drive frequency enters a resonant state with respect to the shape and size of the oscillations, thereby maximizing the drive speed and improving drive efficiency of the ultrasonic motor.

In ultrasonic motors for use in high-speed systems, it is important to have, a quick rise response time when the ultrasonic motor is started. Unfortunately, an ultrasonic motor as disclosed in Japanese Patent Publication No. Sho 59-156168 may have an inadequate rise response time when used in high-speed systems. For example, the ultrasonic motor may require an undesireably long drive time to reach a target drive speed. In addition, when the drive time becomes undesireably long, the demand current product (product of the demand current and the time) becomes undesireably large.

SUMMARY OF THE INVENTION

Accordingly, it is an object of the present invention to provide an ultrasonic motor having a reduced rise response time when the ultrasonic motor is started.

It is also an object of the present invention to provide an ultrasonic motor having reduced demand current product.

Objects of the present invention are achieved by providing an ultrasonic motor which is drivable at different frequencies and has a desired target speed, each frequency corresponding to a respective speed and a respective torque. The ultrasonic motor enters a specific mode after being started and driven. The ultrasonic motor comprises a drive control unit which, when the ultrasonic motor is started, drives the ultrasonic motor at a frequency corresponding to approximately a maximum torque. When the ultrasonic motor enters the specific mode, the drive control unit drives the ultrasonic motor at a frequency corresponding to approximately the target speed.

Objects of the present invention are also achieved by providing an ultrasonic motor which is drivable at different drive voltages and has a desired target speed. Each drive voltage having corresponding frequencies, each frequency of each drive voltage corresponding to a respective speed and a respective torque. The ultrasonic motor enters a specific mode after being started and driven. The ultrasonic motor comprises a drive control unit which, when the ultrasonic motor is started, selects a drive voltage, and drives the ultrasonic motor at the selected drive voltage and at a frequency of the selected drive voltage which corresponds to a maximum torque. When the ultrasonic motor enters the specific mode, the drive control unit selects a different drive voltage, and drives the ultrasonic motor at the selected, different drive voltage and at a frequency of the selected, different drive voltage which corresponds to approximately the target speed.

Moreover, objects of the present invention are achieved by providing an ultrasonic motor which is drivable at a first drive voltage and second drive voltage and has a desired target speed. The second drive voltage is lower than the first drive voltage, the first and second drive voltages each having corresponding frequencies. Each frequency of the first and second drive voltages corresponding to a respective speed and a respective torque. The ultrasonic motor enters a first mode after being started and driven, and enters a second mode after entering the first mode. The ultrasonic motor comprises a drive control unit which, when the ultrasonic motor is started, drives the ultrasonic motor at the second drive voltage and at a frequency of the second drive voltage which corresponds to approximately a maximum torque. When the ultrasonic motor enters the first mode, the drive control unit drives the ultrasonic motor at the first drive voltage and at a frequency of the first drive voltage which corresponds to approximately a maximum torque at the first drive voltage. When the ultrasonic motor enters the second mode, the drive control unit drives the ultrasonic motor at the first drive voltage and at a frequency of the first drive voltage which corresponds to approximately the target speed.

DESCRIPTION OF THE PREFERRED EMBODIMENTS

Figure 1A:
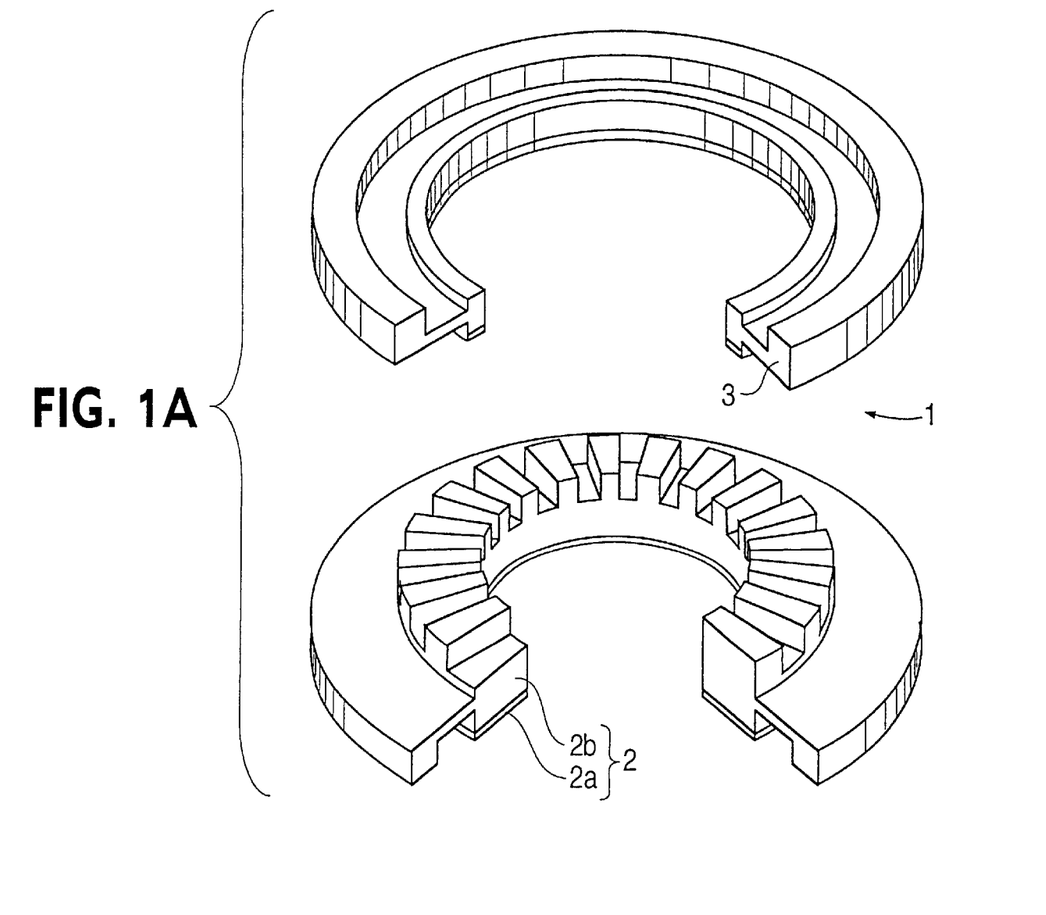
FIG. 1A is a diagram illustrating an oblique view of an ultrasonic motor which is ideally suited for drive control according to embodiments of the present invention.

Reference will now be made to the figures, wherein like reference numerals represent similar structures or processes throughout the drawings. Referring to FIG. 1A, which is a diagram illustrating an oblique view of an ultrasonic motor that is ideally suited for drive control according to an embodiment of the present invention, an ultrasonic motor 1 comprises a stator 2 and a moving body 3 which are pressure-welded together. Stator 2 comprises a piezoelectric body 2a and an elastic body 2b. FIG. 1A illustrates a cross section cut out from stator 2 and moving body 3. However, stator 2 and moving body 3 are approximately ring shaped. When a drive signal is applied to piezoelectric body 2a, piezoelectric body 2a is excited, thereby generating travelling oscillatory waves in elastic body 2b. Through these oscillatory waves, moving body 3 comes into contact with stator 2 to be driven by stator 2. A similar ultrasonic motor is fully described in U.S. patent application Titled "ULTRASONIC MOTOR HAVING IMPROVED STATOR", U.S. Ser. No. 08/188,789, filed on Jan. 31, 1994, which is incorporated herein by reference.

Figure 1B:
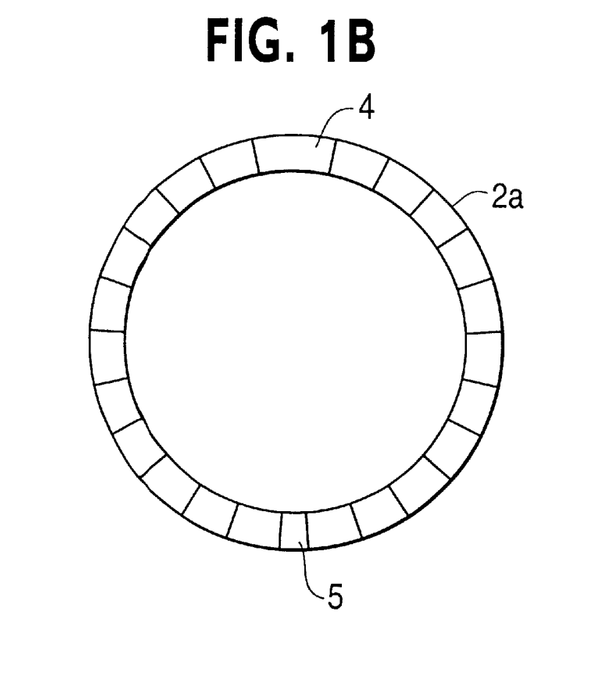
FIGS. 1B, 1C and 1D are diagrams illustrating perspective views of a piezoelectric body formed as a part of a stator of the ultrasonic motor illustrated in FIG. 1A, according to embodiments of the present invention.
Figure 1C:
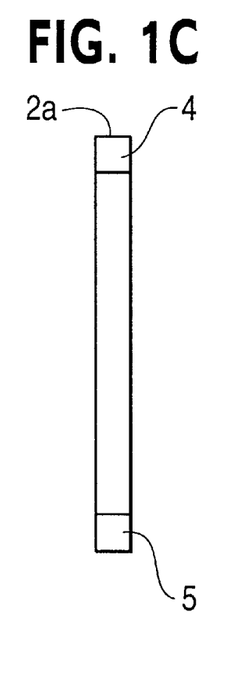
Figure 1D:
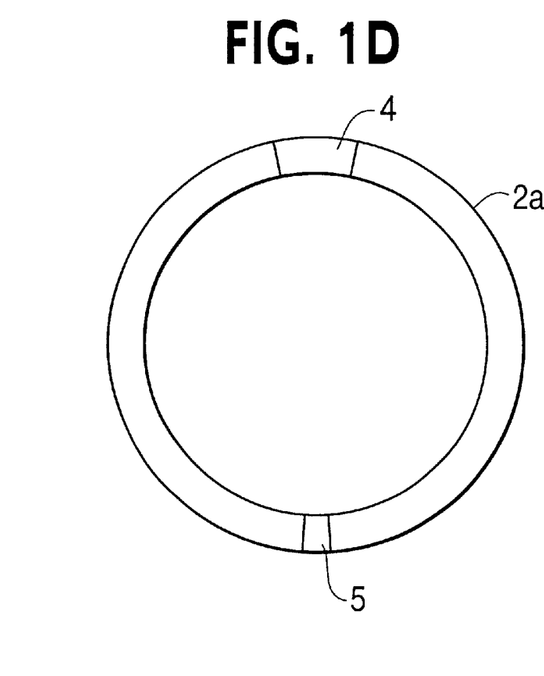

FIGS. 1B, 1C and 1D are diagrams illustrating perspective views of piezoelectric body 2a of stator 2. As illustrated in FIGS. 1B, 1C and 1D, piezoelectric body 2a includes a ground 4 and a monitor electrode 5. Monitor electrode 5 produces a signal having a voltage which corresponds to the width of oscillations, or vibrations, of the ultrasonic motor. The ultrasonic motor is driven by an input signal. A phase difference exists between the input signal and the signal produced by monitor electrode 5. The phase difference changes in response to the width of oscillations, or vibrations, of the ultrasonic motor. A monitor electrode, and the driving of an ultrasonic motor according to an input signal and a signal produced by the monitor electrode, is disclosed in U.S. patent application Titled "ULTRASONIC MOTOR HAVING IMPROVED STATOR", U.S. Ser. No. 08/188,789, filed on Jan. 31, 1994, and previously mentioned. More specifically, in FIGS. 5 and 6 and the corresponding disclosure of U.S. patent application Titled "ULTRASONIC MOTOR HAVING IMPROVED STATOR", a monitor electrode is illustrated as "Terminal P" and provided with reference numeral "25", The driving of an ultrasonic motor according to an input signal and a signal produced by a monitor electrode is disclosed in FIG. 6 and the corresponding disclosure of U.S. patent application Titled "ULTRASONIC MOTOR HAVING IMPROVED STATOR".

Figure 2:
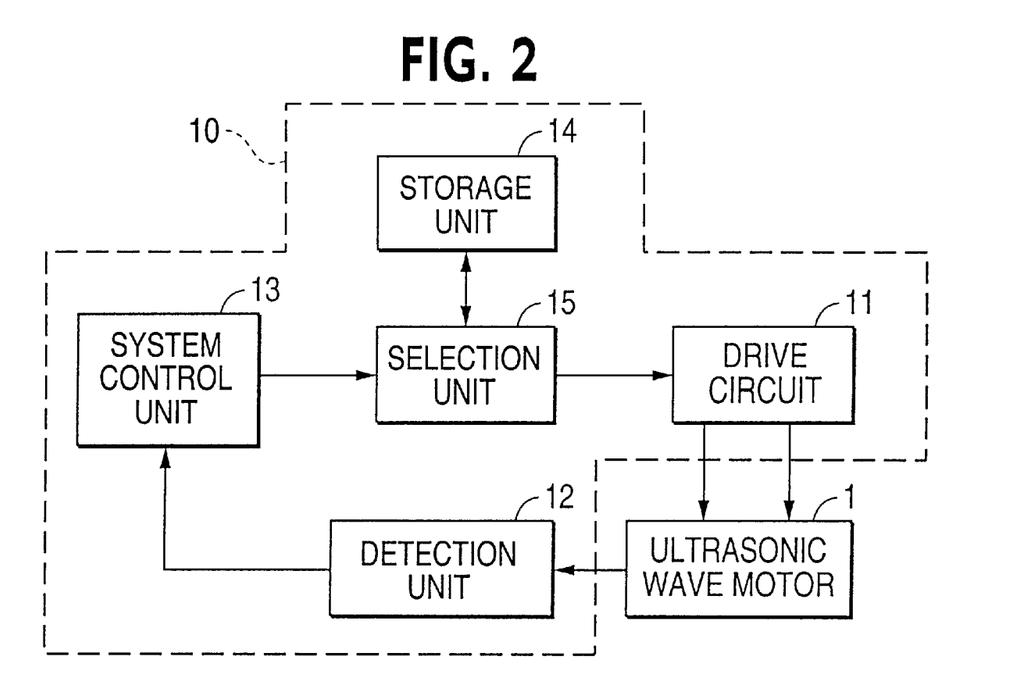
FIG. 2 is a block diagram illustrating a drive control unit of an ultrasonic motor according to an embodiment of the present invention.

FIG. 2 is a block diagram illustrating a drive control unit 10 of an ultrasonic motor, according to an embodiment of the present invention. Drive control unit 10 comprises a drive circuit 11, a detection unit 12, a system control unit 13, a storage unit 14 and a selection unit 15. Drive circuit 11 is electrically connected to ultrasonic motor 1 and supplies a drive signal to an input electrode (not illustrated) of piezoelectric body 2a of ultrasonic motor 1. Detection unit 12 detects the speed of ultrasonic motor 1. System control unit 13 controls the drive system of ultrasonic motor 1. Storage unit 14 stores data relating to the drive frequency of ultrasonic motor 1. For example, storage unit stores data relating to the relationship between the drive frequency, starting torque, and speed, or stores data relating to the relationship between the drive frequency, starting torque, speed and drive voltage. Based on a command signal generated by system control unit 13, selection unit 15 selects a specified drive control value from storage unit 14.

Figure 3:
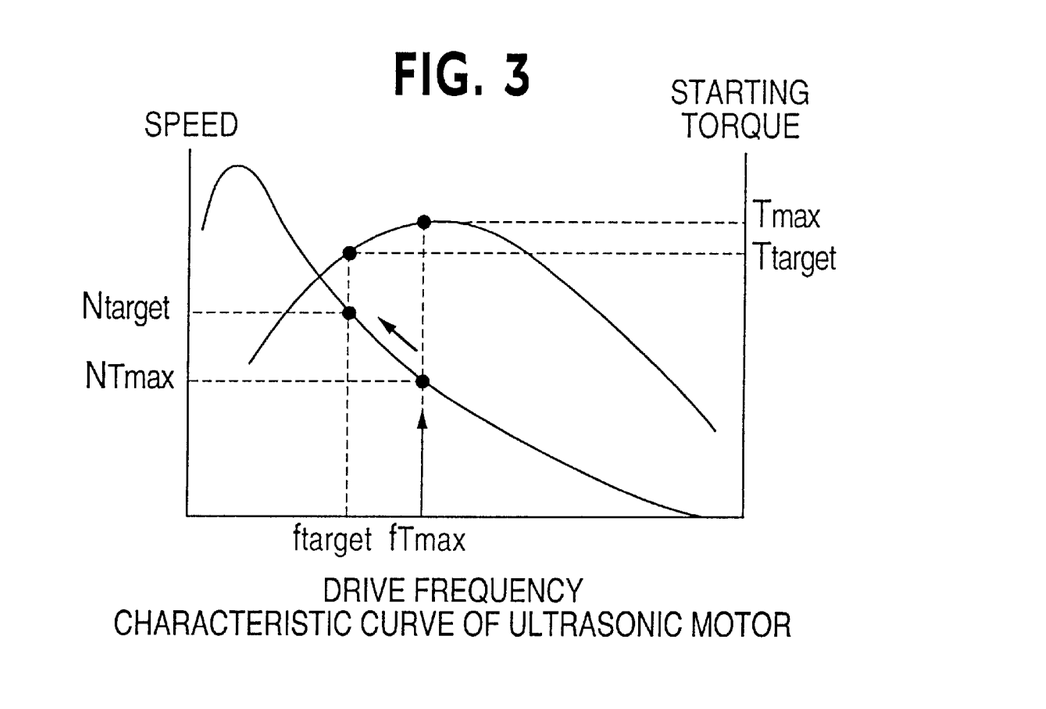
FIG. 3 is a diagram illustrating characteristic curves of an ultrasonic motor, according to a first embodiment of the present invention.

FIG. 3 is a diagram illustrating characteristic curves of an ultrasonic motor, according to a first embodiment of the present invention. More specifically, FIG. 3 illustrates characteristic curves where the drive voltage of ultrasonic motor 1 is fixed. In FIG. 3, Ntarget is the target speed (that is, the desired speed), Ttarget is the starting torque at the target speed Ntarget, ftarget is the drive frequency corresponding to the target speed Ntarget, Tmax is the maximum starting torque, NTmax is the speed at the maximum starting torque Tmax, and fTmax is the drive frequency corresponding to the speed NTmax. The starting torque Ttarget at the target speed Ntarget and the corresponding drive frequency ftarget do not always match the maximum starting torque Tmax and the corresponding drive frequency ftmax. Therefore, in conventional drive control where drive is performed at the drive frequency ftarget corresponding to the target speed Ntarget, driving is performed at a frequency at which the starting torque is not maximized.

Figure 4:
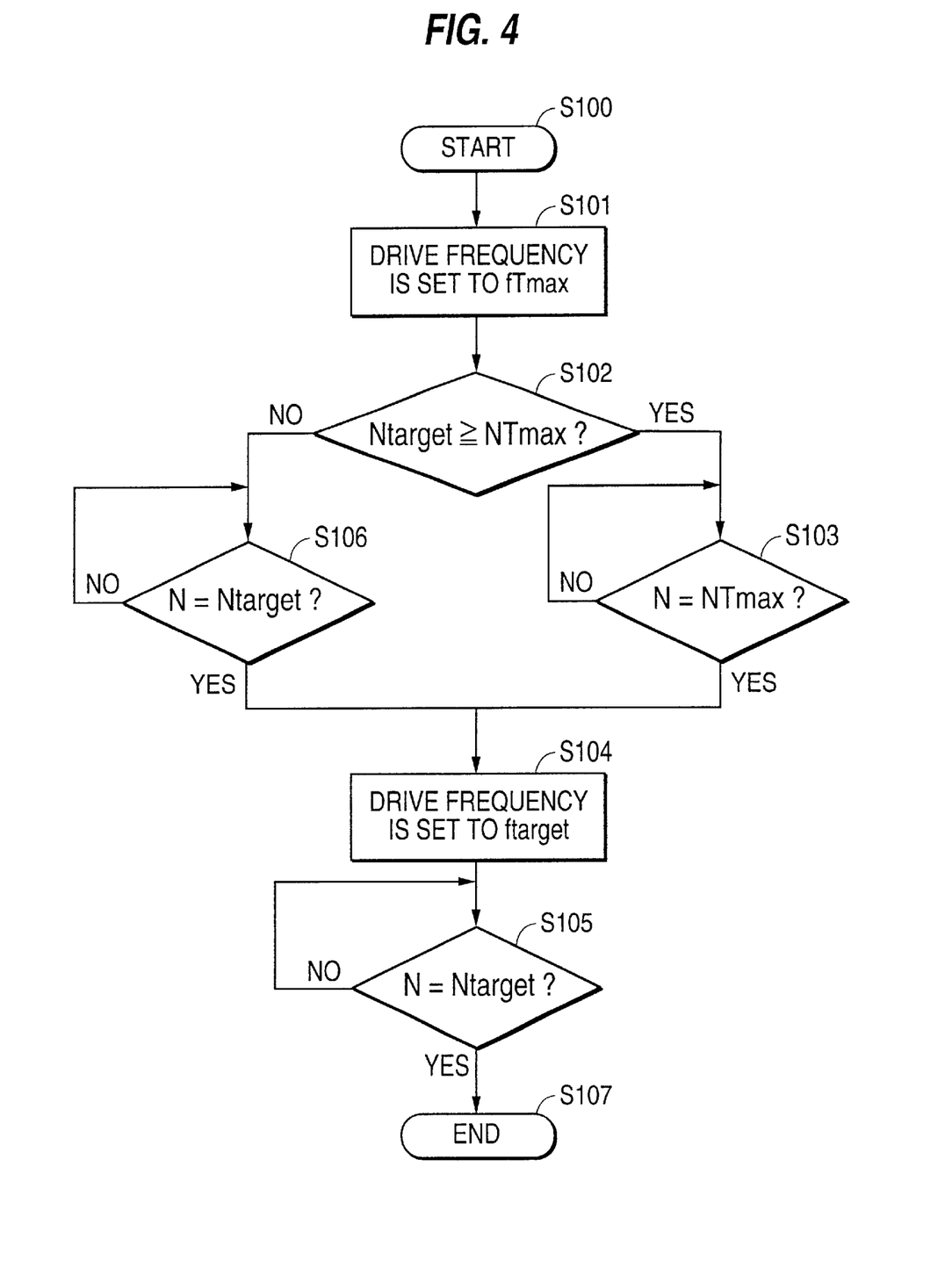
FIG. 4 is a flow chart illustrating a processing sequence of drive control, according to the first embodiment of the present invention.

FIG. 4 is a flow chart illustrating a processing sequence of drive control, according to the first embodiment of the present invention. The processing sequence of FIG. 4 is best understood by referring to the characteristic curves illustrated in FIG. 3.

As illustrated in FIG. 4 the process starts in step S100. Then, in step S101, system control unit 13 initially sets the drive frequency to ftmax. That is, selection unit 15 receives a command from system control unit 13, selects from storage unit 14 the drive frequency ftmax at which the maximum starting torque Tmax can be obtained, and transfers the drive frequency ftmax to drive circuit 11. Drive circuit 11 supplies a drive signal to piezoelectric body 2a in accordance with the drive frequency ftmax. From step S101, the process moves to step S102 where system control unit 13 compares the target speed Ntarget with the speed NTmax corresponding to drive frequency fTmax. When Ntarget≧NTmax (as illustrated in FIG. 3), the process moves to step S103 where the drive frequency is maintained at ftmax until the speed of ultrasonic motor 1 reaches NTmax. Detection unit 12 detects whether or not the speed of ultrasonic motor 1 has reached NTmax. In step S103, when it has been determined by detection unit 12 that the speed has reached NTmax, the process moves to step S104 where system control unit 13 modifies the setting of the drive frequency from ftmax to ftarget. That is, in step S104, selection unit 15 receives a command from system control unit 13, selects from storage unit 14 the drive frequency ftarget corresponding to the target speed Ntarget, and transfers the drive frequency ftarget to drive circuit 11. Drive circuit 11 supplies a drive signal to piezoelectric body 2a in accordance with the drive frequency ftarget. From step S104, the process moves to step S105 where it is determined whether the speed of ultrasonic motor 1 has reached the target speed Ntarget. If the speed of ultrasonic motor 1 has not reached the target speed Ntarget, the process waits at step S105 until the speed of ultrasonic motor 1 reaches the target speed Ntarget. If the speed of ultrasonic motor 1 has reached the target speed Ntarget in step S105, the process ends in step S107.

On the other hand, when Ntarget is not ≧NTmax in step S102, the process moves to step S106 where the drive frequency is maintained at ftmax until the speed of ultrasonic motor 1 reaches Ntarget. When the speed of ultrasonic motor 1 reaches Ntarget in step S106, the process moves to step S104 where the drive frequency is set to ftarget.

Figure 5:
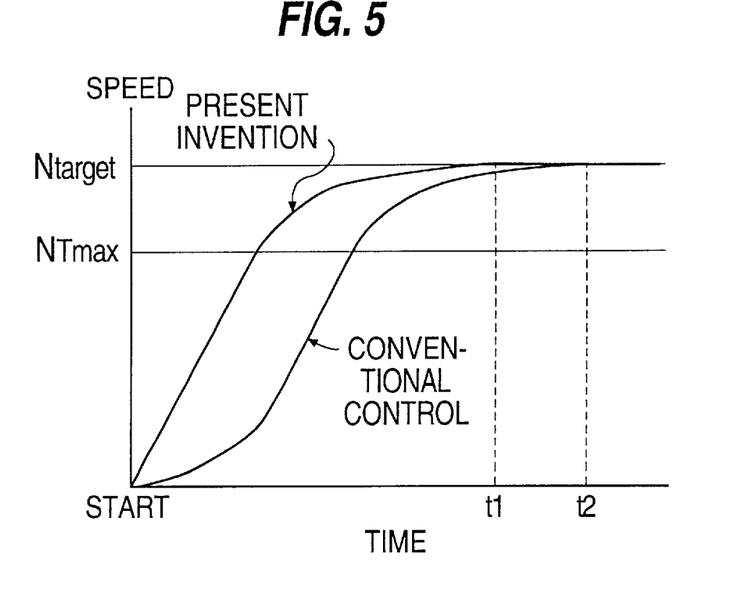
FIG. 5 is a diagram illustrating a comparison of the rise response time of an ultrasonic motor having drive control according to the first embodiment of the present invention, and the rise response time of an ultrasonic motor according to conventional drive control.

FIG. 5 is a diagram illustrating a comparison of the rise response time of an ultrasonic motor having drive control according to the first embodiment of the present invention, and the rise response time of an ultrasonic motor according to conventional drive control. With conventional drive control where drive is performed from the start at drive frequency ftarget corresponding to the target speed Ntarget, ultrasonic motor 1 reaches the target speed Ntarget at time t2. By contrast, with drive control according to the first embodiment of the present invention as illustrated in FIG. 4, ultrasonic motor 1 reaches the target speed Ntarget at time t1. As can be seen from FIG. 5, t1 is less than t2. Thus, the rise response time with drive control according to the first embodiment of the present invention is less than the rise response time with conventional drive control. As a result, the demand current product is reduced and drive efficiency and drive performance are improved with drive control according to the first embodiment of the present invention, as compared with conventional drive control.

In an ultrasonic motor having drive control according to the first embodiment of the present invention, the drive frequency ftmax corresponding to the maximum starting torque Tmax, and the drive frequency ftarget corresponding to the target speed Ntarget were selected. However, by storing data relating to the drive frequency with respect to multiple drive voltages in storage unit 14, it is possible to initially select an optimum drive voltage and to select the drive frequency corresponding to the maximum starting torque with respect to (a) the optimum drive voltage and (b) the drive frequency corresponding to the target speed.

In an ultrasonic motor according to the first embodiment of the present invention, drive control unit 10 controls the driving of ultrasonic motor 1. Ultrasonic motor 1 comprises piezoelectric body 2a and stator 2. Stator 2 includes elastic body 2b Piezoelectric body 2a is excited by a drive signal to generate travelling oscillatory waves in elastic body 2b to drive moving body 3. Storage unit 14 stores data relating to the drive frequency of ultrasonic motor 1. Detection unit 12 detects the drive mode of ultrasonic motor 1. System control unit 13 selects the drive frequency at which s approximately the largest starting torque can be obtained based on the data stored in storage unit 14. When the drive mode detected by detection unit 12 has become a specific mode, system control unit 13 selects the drive frequency at which the target speed can be obtained, based on the data stored in storage unit 14. Drive circuit 11 which supplies a drive signal to piezoelectric body 2a, based on the drive frequency selected by system control unit 13.

In an ultrasonic motor according to the first embodiment of the present invention, ultrasonic motor 1 is drivable at different frequencies and has a desired target speed. Each frequency corresponds to a respective speed and a respective torque. Ultrasonic motor 1 enters a "specific mode", after being started and driven. Ultrasonic motor 1 comprises a drive control unit 10 which, when ultrasonic motor 1 is started, drives ultrasonic motor 1 at a frequency corresponding to approximately a maximum torque. When ultrasonic motor 1 enters the specific mode, drive control unit 10 drives ultrasonic motor 10 at a frequency corresponding to approximately the target speed. In an ultrasonic motor according to the first embodiment of the present invention, the "specific mode", as illustrated in FIG. 4, refers, for example, to the different modes possible from steps S102, S103 and S106. For example, ultrasonic motor 1 enters a "specific mode" when, in step S102, Ntarget is ≧NTmax and then, in step S103, N=NTmax. Also, ultrasonic motor 1 enters a "specific mode" when, in step S102, Ntarget is not ≧NTmax and then, in step S106, N=Ntarget. As illustrated in FIG. 4, when ultrasonic motor 1 enters either of the above-described "specific modes", the drive frequency is set to ftarget (see step S104).

Figure 6:
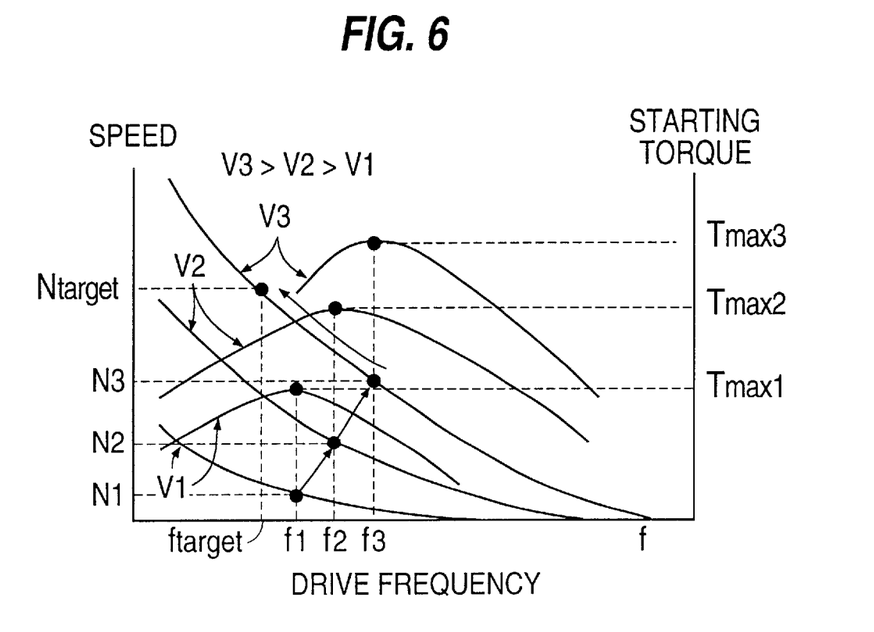
FIG. 6 is a diagram illustrating characteristic curves of an ultrasonic motor according to a second embodiment and a third embodiment of the present invention.

FIG. 6 is a diagram illustrating characteristic curves of an ultrasonic motor according to a second embodiment and a third embodiment of the present invention More particularly, FIG. 6 illustrates characteristic curves where the drive voltage of ultrasonic motor 1 is variable. In a similar manner as disclosed above for an ultrasonic motor having drive control according to the first embodiment of the present invention, when driving is performed at a drive frequency ftarget corresponding to the target speed Ntarget, the starting torque is driven at a frequency which is not at its maximum value.

Figure 7:
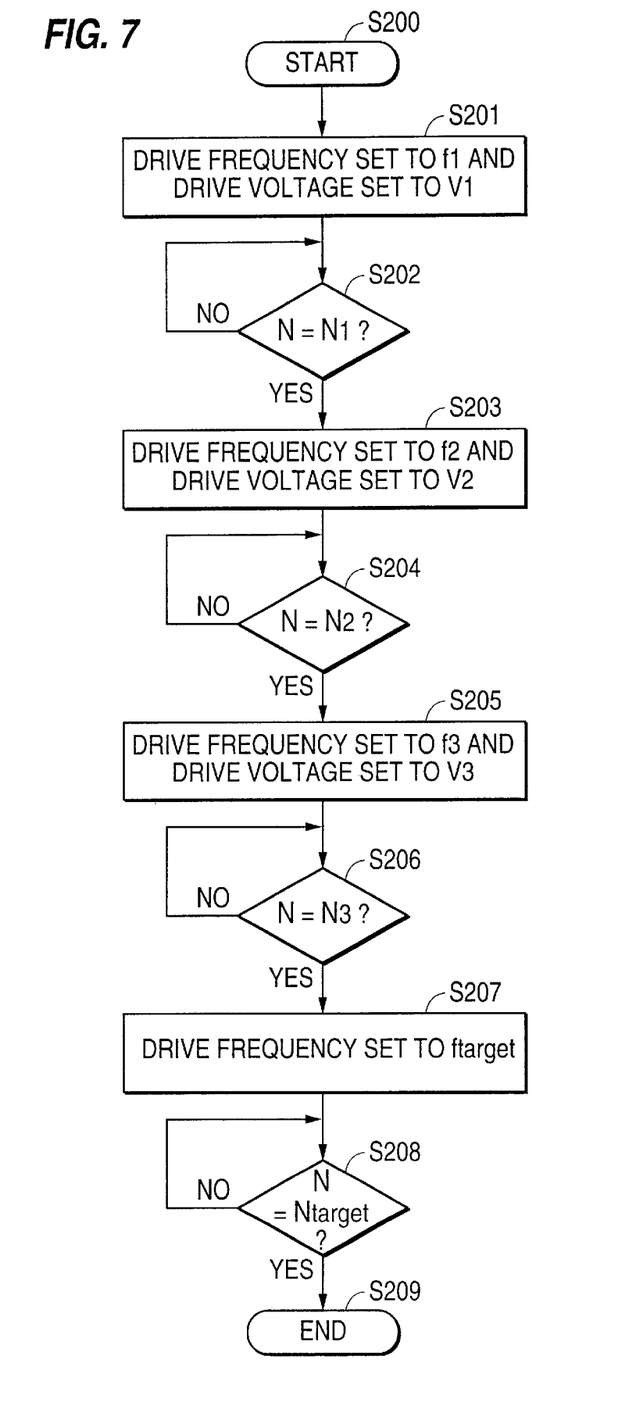
FIG. 7 is a flow chart illustrating a processing sequence of drive control, according to the second embodiment and the third embodiment of the present invention.

FIG. 7 is a flow chart illustrating a processing sequence of drive control, according to the second embodiment and the third embodiment of the present invention. The processing sequence of FIG. 7 is best understood by referring to the characteristic curves illustrated in FIG. 6.

As illustrated in FIG. 7 the process starts in step S200. Then, in step S201, system control unit 13 initially sets the drive voltage to V1 and also sets the drive frequency to f1, which corresponds to the frequency at which the maximum starting torque Tmax1 can be obtained. That is, selection unit 15 receives a command from system control unit 13, selects from storage unit 14 the drive frequency f1 at which the maximum starting torque Tmax1 at this time can be obtained, and transfers the drive frequency f1 to drive circuit 11. Drive circuit 11 supplies a drive signal to piezoelectric body 2a in accordance with the drive frequency f1.

From step S201, the process moves to step S202 where the drive voltage is maintained at V1 and the drive frequency is maintained at f1 until the speed of ultrasonic motor 1 reaches N1. In step S202, when detection unit 12 detects that the speed of ultrasonic motor 1 has reached N1, the process moves to step S203 where system control unit 13 sets the drive voltage to V2 and also sets the drive frequency to drive frequency f2, corresponding to maximum starting torque Tmax2. From step S203, the process moves to step S204 where the drive voltage is maintained at V2 and the drive frequency is maintained at f2 until the speed reaches N2. In step S204, when it has been detected that the speed of ultrasonic motor 1 has reached N2, the process moves to step S205.

In step S205, system control unit 13 sets the drive voltage to V3 and also sets the drive frequency to drive frequency f3, corresponding to the maximum starting torque Tmax3. From step S205, the process moves to step S206 where the drive voltage is maintained at V3 and the drive frequency is maintained at f3 until the speed of ultrasonic motor 1 reaches N3. In step S206, when it is detected that the speed of ultrasonic motor 1 has reached N3, the process moves to step S207 where system control unit 13 maintains the drive voltage at V3 and sets the drive frequency to ftarget, corresponding to the target speed Ntarget. From step S207, the process moves to step S208 where ultrasonic motor 1 is driven until the speed reaches the target speed Ntarget. When the speed of ultrasonic motor 1 reaches the target speed Ntarget in step S208, the process ends in step S209.

In an ultrasonic motor with drive control according to the second embodiment of the present invention as illustrated in FIGS. 6 and 7, driving is initially performed at drive voltages V1 and V2, which are smaller than the target drive voltage V3. Then, driving is performed at target drive voltage V3. In this manner, the time until the speed reaches N3 can be shortened as compared to the case where driving is initially performed at the target drive voltage V3.

In an ultrasonic motor having drive control in accordance with the second embodiment of the present invention, the modification of the drive voltage was set to three stages (V1, V2 and V3). However, the embodiments of the present invention are not intended to be limited in the number of stages. Virtually any number of stages can be used to drive an ultrasonic motor.

In an ultrasonic motor having drive control in accordance with the second embodiment of the present invention, storage unit 14 stores data relating to the drive frequencies with respect to multiple drive voltages. System control unit 13 selects the drive voltage and the drive frequency at which approximately the largest starting torque can be obtained, based on the data stored in storage unit 14. When the drive mode detected by detection unit 12 has become a specific mode, system control unit 13 selects the drive voltage and drive frequency at which the target speed can be obtained, based on the data stored in storage unit 14.

In an ultrasonic motor having drive control according to the second embodiment of the present invention, storage unit 14 stores data relating to the drive frequency with respect to a first drive voltage, and data relating to the drive frequency with respect to a second drive voltage. The second drive voltage is lower than the first drive voltage Detection unit 12 detects the drive mode of ultrasonic motor 1. System control unit selects the second drive voltage and the drive frequency at which approximately the largest starting torque can be obtained at the second drive voltage, based on the data stored in storage unit 14. In the case where the drive mode detected by detection unit 12 has become a specific mode, system control unit 13 selects the first drive voltage and the drive frequency at which approximately the largest starting torque can be obtained at the first drive voltage, based on the data stored in storage unit 14. Then, system control unit 13 selects the drive frequency at which the target speed can be obtained at the first drive voltage.

In an ultrasonic motor according to the second embodiment of the present invention, ultrasonic motor 1 is drivable at different drive voltages and has a desired target speed. Each drive voltage has corresponding frequencies, and each frequency of each drive voltage corresponding to a respective speed and a respective torque. Ultrasonic motor 1 enters a specific mode after being started and driven. Ultrasonic motor comprises a drive control unit 10 which, when ultrasonic motor 1 is started, selects a drive voltage, drives ultrasonic motor 1 at the selected drive voltage and at a frequency of the selected drive voltage which corresponds to a maximum torque. When ultrasonic motor 1 enters the specific mode, drive control unit 10 selects a different drive voltage, drives ultrasonic motor 1 at the selected, different drive voltage and at a frequency of the selected, different drive voltage which corresponds to approximately the target speed. In an ultrasonic motor according to the second embodiment of the present invention, the "specific mode", as illustrated in FIG. 7, refers, for example, to the mode illustrated by step S204. For example, ultrasonic motor 1 enters a "specific mode" when, in step S204, the speed N=N3. As illustrated in FIG. 7, when ultrasonic motor 1 enters this "specific mode", a different drive voltage is selected in step S205 and then, in step S207, the drive frequency is set to ftarget (corresponding to the target speed).

In an ultrasonic motor according to a third embodiment of the present invention, ultrasonic motor 1 is drivable at a first drive voltage and second drive voltage and has a desired target speed. The second drive voltage is lower than the first drive voltage The first and second drive voltages each have corresponding frequencies, each frequency of the first and second drive voltages corresponding to a respective speed and a respective torque. Ultrasonic motor 1 enters a first mode (see, for example, step S204 in FIG. 7) after being started and driven, and enters a second mode (see, for example, step S206 in FIG. 7) after entering the first mode. Ultrasonic motor 1 comprises a drive control unit 10 which, when ultrasonic motor 1 is started, drives ultrasonic motor 1 at the second drive voltage and at a frequency of the second drive voltage which corresponds to approximately a maximum torque (see, for example, step S203 in FIG. 7). When ultrasonic motor 1 enters the first mode (see, for example, step S204 in FIG. 7), drive control unit 10 drives ultrasonic motor 10 at the first drive voltage and at a frequency of the first drive voltage which corresponds to approximately a maximum torque at the first drive voltage (see, for example, step S205 in FIG. 7). When ultrasonic motor 1 enters the second mode (see, for example, step S206 in FIG. 7), drive control unit 10 drives ultrasonic motor 1 at the first drive voltage and at a frequency of the first drive voltage which corresponds to approximately the target speed (see, for example, step S207 in FIG. 7).

In an ultrasonic motor according to the third embodiment of the present invention, ultrasonic motor 1 is driven at a lower voltage and at a frequency corresponding to a maximum torque (see step S201 or step S203 in FIG. 7). Ultrasonic motor 1 enters a "first mode" in step S204 when the speed N=N2. When ultrasonic motor 1 enters the first mode in step S204, the process moves to step S205 where a different drive voltage is set and the frequency is set to a frequency corresponding to the maximum torque. Then, ultrasonic motor 1 enters a "second mode" in step S206 when the speed N=N3. When ultrasonic motor 1 enters the second mode in step S206, the process moves to step S207 where the frequency is changed to the frequency ftarget corresponding to the target speed.

In an ultrasonic motor having drive control according to the above embodiments of the present invention, detection unit 12 detects the speed of ultrasonic motor 1 However, a drive mode of ultrasonic motor 1 may also be detected. For example, monitor electrode 5 produces a signal, wherein the specific mode is related to the signal. Detection unit 12 would then detect the signal. Drive control unit 10 can determine that the ultrasonic motor enters the specific mode by the detection of the signal produced by monitor electrode 5. Alternatively, the ultrasonic motor can receive an input signal and have monitor electrode 5 produce a monitor signal, where a phase difference exists between the input signal and the monitor signal. The specific is related to the phase difference. Detection unit 12 can then detect the phase difference. Drive control unit 10 would determine that the ultrasonic motor enters the specific mode by the detection of the phase difference.

Moreover, the characteristic of an ultrasonic motor changes with the temperature. Therefore, if drive control is performed while considering the temperature, the rise response time during starting can be further shortened. For example, a temperature detector (not illustrated) may be attached to detect the temperature, and the drive frequency, or the drive voltage and the drive frequency, may be set in accordance with the temperature. Thus, the relationship between the drive frequency, starting torque and speed, or the relationship between the drive frequency, starting torque, speed and the drive voltage at each temperature can be stored in storage unit 14.

In an ultrasonic motor having drive control according to the above embodiments of the present invention, the rise response time at the starting of the ultrasonic motor is shortened. As a result, the demand current product can be reduced and drive efficiency improved.

In an ultrasonic motor having drive control according to the above embodiments of the present invention, storage unit 14 stores the relationship between the drive frequency, starting torque, and speed of ultrasonic motor 1.

In an ultrasonic motor having drive control according to the above embodiments of the present invention, the drive frequency or the drive voltage are changed when the ultrasonic motor enters a "specific mode", However, the term "specific mode" (or the "first mode" and the "second mode" discussed above) is not intended to be limited to the specific examples described herein. There are many obvious variations of a specific mode after which the operational characteristics of the ultrasonic motor can be changed Also, the above embodiments of the present invention describe a drive control unit as driving an ultrasonic motor when the ultrasonic motor is "started", The term "started" can refer to many different points in time. For example, the ultrasonic motor can be said to be "started" when the power is turned ON, when the drive control is initially initiated after the power is turned ON, etc.

Although a few preferred embodiments of the invention have been shown and described, it will be appreciated by those skilled in the art that changes may be made in these embodiments, without departing from the principles and the spirit of the invention, the scope of which is defined in the claims and their equivalents.

What is claimed is:

1. A vibration motor which is drivable at different frequencies and has a desired target speed, each frequency causing the vibration motor to be driven at a respective, corresponding speed and a respective, corresponding torque, the vibration motor entering a specific mode after being started and driven, the vibration motor comprising:
   a detection unit which detects when the vibration motor enters the specific mode; and
   a drive control unit which, when the vibration motor is started, drives the vibration motor at the frequency that causes the vibration motor to be driven at approximately the maximum starting torque and, when the detection unit detects that the vibration motor enters the specific mode, drives the motor at a frequency that causes the vibration motor to be driven at approximately the target speed;
   wherein the drive control unit comprises a storage unit which stores data indicating the relationship between drive frequency, torque and speed, and
   the drive control unit drives the vibration motor by referring to the data stored in the storage unit.

2. A vibration motor which is drivable at different drive voltages, and at a plurality of frequencies for each drive voltage, and has a desired target speed, each frequency of the plurality of frequencies for each drive voltage causing the vibration motor to be driven at a respective, corresponding speed and a respective, corresponding torque, the vibration motor entering a specific mode after being started and driven, the vibration motor comprising:
   a detection unit which detects when the vibration motor enters the specific mode; and
   a drive control unit which, when the vibration motor is started, selects a drive voltage, drives the vibration motor at the selected drive voltage and at the frequency of the plurality of frequencies for the selected drive voltage that causes the vibration motor to be driven at approximately the maximum starting torque of the plurality of frequencies for the selected drive voltage and, when the detection unit detects that the vibration motor enters the specific mode, selects a different drive voltage, drives the vibration motor at the selected, different drive voltage and at a frequency of the plurality of frequencies for the selected, different drive voltage that causes the vibration motor to be driven at approximately the target speed;
   wherein, the drive control unit comprises a storage unit which stores data indicating the relationship between drive frequency, torque and speed, and
   the drive control unit drives the vibration motor by referring to the data stored in the storage unit.

3. A vibration motor which is drivable at a first drive voltage, and at a plurality of frequencies for the first drive voltage, and a second drive voltage, and at a plurality of frequencies for the second drive voltage, and has a desired target speed, the second drive voltage being lower than the first drive voltage, each frequency of the plurality of frequencies for the first and second drive voltages causing the vibration motor to be driven at a respective, corresponding speed and a respective, corresponding torque, the vibration motor entering a first mode after being started and driven, and entering a second mode after entering the first mode, the vibration motor comprising:
   a detection unit which detects when the vibration motor enters the first mode and detects when the vibration motor enters the second mode; and
   a drive control unit which, when the vibration motor is started, drives the vibration motor at the second drive voltage and at the frequency of the plurality of frequencies for the second drive voltage that causes the vibration motor to be driven at approximately the maximum starting torque of the plurality of frequencies for the second drive voltage and, when the detection unit detects that the vibration motor enters the first mode, drives the vibration motor at the first drive voltage and at the frequency of the plurality of frequencies for the first drive voltage that causes the vibration motor to be driven at approximately the maximum starting torque of the plurality of frequencies for the first drive voltage and, when the detection unit detects that the vibration motor enters the second mode, drives the vibration motor at the first drive voltage and at a frequency of the plurality of frequencies for the first drive voltage that causes the vibration motor to be driven at approximately the target speed.

4. A vibration motor as in claim 3, wherein the vibration motor enters the first mode when the vibration motor reaches an approximate first predetermined speed and the vibration motor enters the second mode when the vibration motor reaches an approximate second predetermined speed.

5. A vibration motor as in claim 3, wherein the drive control unit comprises:
   a storage unit which stores data indicating the relationship between drive frequency, torque and speed,
   the drive control unit drives the vibration motor by referring to the data stored in the storage unit.

6. A vibration motor as in claim 3, wherein the first and second modes are related to the speed of the vibration motor and the detection unit detects that the vibration motor enters the first and second modes by detecting the speed of the vibration motor.

7. A vibration motor as in claim 3, wherein the vibration motor has a monitor electrode which produces a signal and the first and second modes are related to the signal, the detection unit detecting that the vibration motor enters the first and second modes by detecting the signal produced by the monitor electrode.

8. A vibration motor as in claim 3, wherein the vibration motor receives an input signal and has a monitor electrode which produces a monitor signal, a phase difference existing between the input signal and the monitor signal, the first and second modes being related to the phase difference, the detection unit detecting that the vibration motor enters the first and second modes by detecting the phase difference.

9. A method of driving a vibration motor which is drivable at a first drive voltage, and at a plurality of frequencies for the first drive voltage, and a second drive voltage, and at a plurality of frequencies for the second drive voltage, and has a desired target speed, the second drive voltage being lower than the first drive voltage, each frequency of the plurality of frequencies for the first and second drive voltages causing the vibration motor to be driven at a respective, corresponding speed and a respective, corresponding torque, the vibration motor entering a first mode after being started and driven, and entering a second mode after entering the first mode, the method comprising:

detecting when the vibration motor enters the first mode and detecting when the vibration motor enters the second mode;

driving, when the vibration motor is started, the vibration motor at the second drive voltage and at the frequency of the plurality of frequencies for the second drive voltage that causes the vibration motor to be driven at approximately the maximum starting torque of the plurality of frequencies for the second drive voltage;

driving, when the vibration motor enters the first mode, the vibration motor at the first drive voltage and at the frequency of the plurality of frequencies for the first drive voltage that causes the vibration motor to be driven at approximately the maximum starting torque of the plurality of frequencies for the first drive voltage; and     driving, when the vibration motor enters the second mode, the ultrasonic motor at the first drive voltage and at a frequency of the plurality of frequencies for the first drive voltage that causes the vibration motor to be driven at approximately the target speed.

* * * * *

UNITED STATES PATENT AND TRADEMARK OFFICE
CERTIFICATE OF CORRECTION

PATENT NO. : 6,437,480 B1
DATED : August 20, 2002
INVENTOR(S) : Daisuke Saya

It is certified that error appears in the above-identified patent and that said Letters Patent is hereby corrected as shown below:

<u>Title page,</u>
Item [56], References Cited, U.S. PATENT DOCUMENTS, after
"5,479,063 A    12/95    Suganuma ......310/316" insert the following:
-- 4,954,741    *    9/90    Furutsu et al.....310/316
   4,954,742    *    9/90    Izukawa......... 310/316
   5,384,507    *    1/95    Takada et al.... 310/317
   5,430,343    *    7/95    Takagi........... 310/316
   5,214,339    *    5/93    Naito.............310/316
   5,165,047    *    11/92   Shimizu..........318/116
   5,162,708    *    11/92   Naito et al....... 318/116 --

Signed and Sealed this

Eighth Day of April, 2003

JAMES E. ROGAN
*Director of the United States Patent and Trademark Office*